A. W. HART.
TROLLEY CATCHER OR GUARD.
APPLICATION FILED AUG. 26, 1912.
1,066,008.
Patented July 1, 1913.
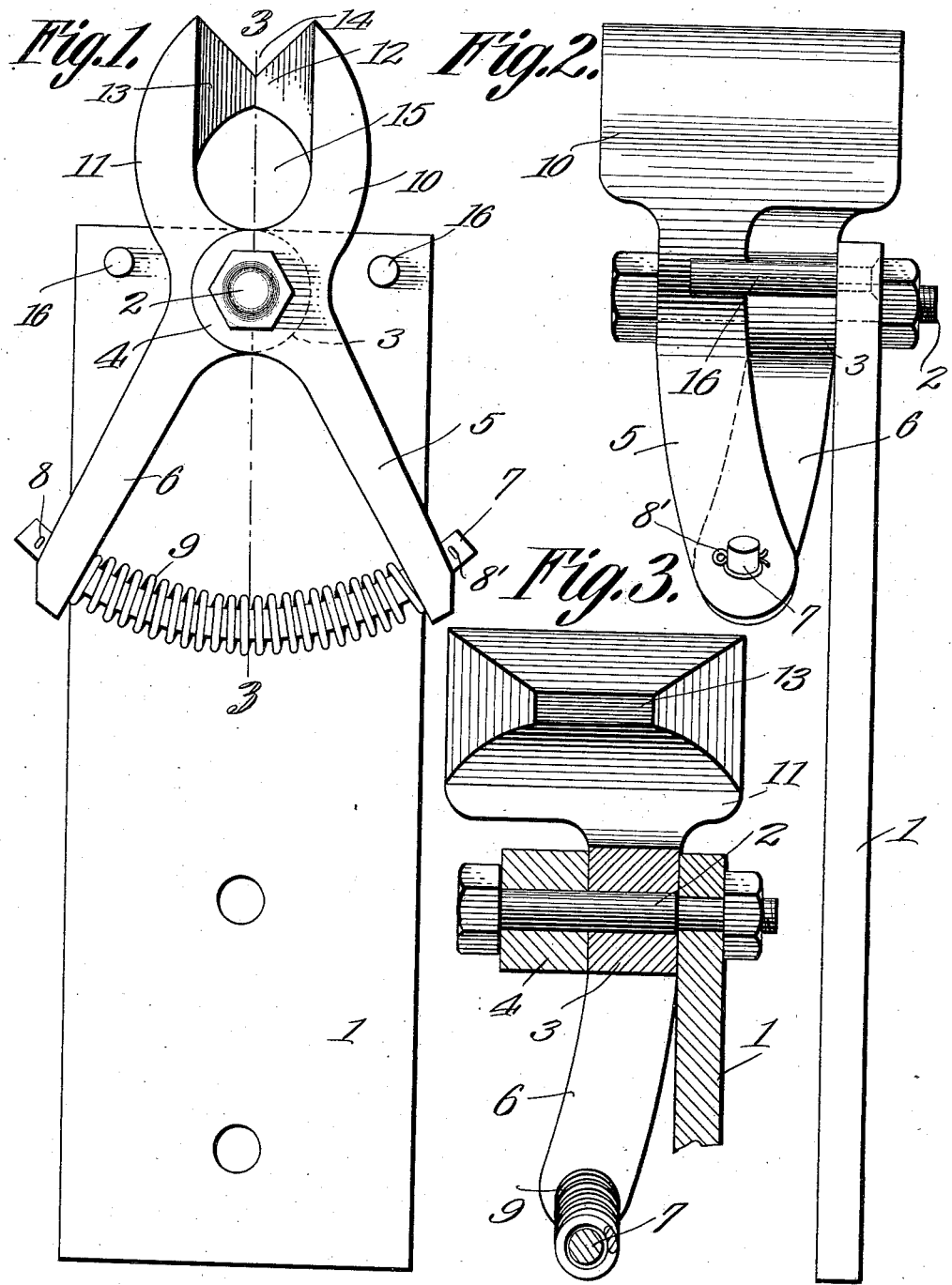
Witnesses
F. B. Wooden.
L. H. Wilson.
A. W. Hart, Inventor,
by C. A. Snow & Co.
Attorneys.

UNITED STATES PATENT OFFICE.

ALLEN W. HART, OF GLENCOE, OHIO.

TROLLEY CATCHER OR GUARD.

1,066,008.  Specification of Letters Patent.  Patented July 1, 1913.

Application filed August 26, 1912. Serial No. 717,159.

*To all whom it may concern:*

Be it known that I, ALLEN W. HART, a citizen of the United States, residing at Glencoe, in the county of Belmont and State of Ohio, have invented a new and useful Trolley Catcher or Guard, of which the following is a specification.

The present invention relates to improvements in trolley catchers or guards, the primary object of this invention being the provision of an auxiliary means disposed to be connected to and carried by the upper end of a trolley pole and disposed in the rear of the usual trolley wheel for automatically gripping or properly surrounding the trolley wire to assist in holding the wheel upon the wire so that said wheel will not jump in making curves or crossings, the said device being so constructed, however, that the same due to any undue strain upon the pole will automatically release the wire.

A further object of the present invention is the provision of a trolley guard constructed in the form of an automatic clamp disposed to be carried by the upper end of a trolley pole adjacent to the trolley wheel thereof, and so constructed as to readily engage the trolley wire when the trolley wheel is guided by the usual rope in proper contact with the wire, the guard so surrounding the wire as to be out of frictional contact therewith during the regular running of the trolley wheel but so constructed as to prevent the trolley pole from flying off of the wire should the wheel jump the same, said clamping device being so constructed as to have its jaws automatically released when the trolley wheel is passing the wire hangers or supports for the trolley wire.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a rear elevation of the complete device. Fig. 2 is a side elevation thereof. Fig. 3 is a section taken on line 3—3 of Fig. 1.

Referring to the drawings, the numeral 1 designates the attaching plate which is provided with apertures for the proper positioning thereof upon the trolley pole at the upper end thereof and to the rear of the trolley wheel, neither the wheel nor the trolley pole being shown. The pivoting and securing pin or bolt 2 is connected to the plate 1 near the upper end thereof and has disposed thereupon cylindrical portions 3 and 4 of the clamp. Each cylinder is provided with its respective handle or terminal 5 and 6 which have threaded therethrough at the lower apertured ends thereof the curved or segmental cylindrical rod or bar 7, which has passing through its outer end the cotters 8—8' which provide a limiting means and also a means for retaining the bar in place. Disposed upon the curved bar 7 between the respective terminals 5 and 6 is a spiral spring 9 whose normal tendency is to hold the terminals 5 and 6 separated and the clamping members in wire clamping or surrounding position.

Formed integral with the respective cylindrical portions 3 and 4 are the jaw ends 10 and 11 respectively, which are provided with truncated pyramidal ends 12—13 which when the jaws are in clamping position, provide the wire guiding recessed portion 14 and the wire receiving aperture 15, the two pins 16 being connected to the supporting plate 1 upon opposite sides of the respective jaws 10 and 11 to provide a means for limiting the opening of the jaws due to the insertion of the trolley wire (not shown) within the aperture 15. This aperture 15 is of such a size as to accommodate the trolley wire without clamping thereupon so that during the normal operation of the clamping device, the wire will be surrounded and out of contact with the respective jaws.

From the foregoing description, taken in connection with the drawings, the operation of the present device is readily understood, but briefly stated is as follows: The plate 1 being attached to upper end of a trolley pole at the rear of the trolley wheel is so held as to present the notched or recessed portion 14 of the respective jaws 10 and 11 directly to the rear of and in line with the grooved portion of the trolley wheel, so that when the trolley pole is in position to have its wheel engage the trolley, the trolley wire will engage the upper portion of the respective jaws 10 and 11 at the recess 14 and by downward pressure thereupon due to the upward pressure of the trolley pole, will force said jaws open so that the wire will pass between the jaws and be finally seated within the aperture or slot 15, the respective ends 12 and 13 of the jaws being in the position as shown in Fig. 1 when surrounding the trolley wire. By pivoting the jaws as shown upon the pivoting bolts 2, the various curvatures in the trolley wire due to curves and other irregularities, will be readily accommodated as the complete clamping member may be moved individually from one side to the other, the pins 16 being provided to limit such movement and also to limit the outward movement of the jaws 10 and 11 when opening for the reception or the release of the trolley wire.

By means of the peculiar shape of the respective ends 12 and 13, it is evident that when the present clamp or guard passes below the respective hangers and cross connections for trolley wires, that the same will automatically be opened to release the trolley wire, to again grip the same at its passage upon the opposite side. It is also evident that should the trolley pole have its wheel suddenly jump the wire, that the clamping device will swing to either side, it being limited by one of the pins 16 and so as to place the solid portion of either jaw to the trolley wire, the adjacent portion of the respective ends 12 and 13, constituting a portion of the outer aperture being so shaped as to hold the wire and prevent it from sliding between and automatically opening the jaws. It is evident, however, that a straight downward pull of the trolley pole when it is necessary to remove the wheel from the wire or in passing the hangers or connections, will cause the wire to move directly upward so as to spread the clamping jaws 10 and 11 and release the wire from the clamp.

What is claimed is:

1. A trolley wheel guard, including a plate for attachment to a trolley pole, a pin carried thereby centrally of one end and at right angles to the face of the plate, two wire embracing members pivoted upon the pin and each having a relatively long truncated lug forming a contact member of the jaw thereof, said jaw projecting beyond the end of the plate, each member having a handle, and a spring disposed between the handles of both members for resiliently holding the reduced ends of the truncated lugs into contact and wire embracing position.

2. A trolley wheel guard, including a plate for attachment to a trolley pole, a pin carried thereby centrally of one end and at right angles to the face of the plate, two wire embracing members pivoted upon the pin and each having a relatively long truncated lug forming a contact member of the jaw thereof, the jaw projecting beyond the end of the plate, each member having a handle, a spring disposed between the handles of both members for resiliently holding the reduced ends of the truncated lugs into contact and wire embracing position, said lugs providing a wire receiving aperture between the inner faces thereof and the pivoting point of the jaws, while the outer faces thereof provide a wire guiding channel, whereby the forcible movement of the wire into engagement with the lugs will cause the automatic opening of the jaws from either side of the lugs.

3. A trolley wheel guard, including a plate for attachment to a trolley pole, a pin carried by and centrally of and adjacent one end of the plate, said pin projecting outwardly from the face of the plate, two wire embracing members pivoted upon the pin, and each having a relatively long truncated lug forming a contact member of the jaw thereof, the jaw being projected beyond the end of the plate, each member further having a handle, a segmental rod threaded through the handles and limiting the extension of the handles, and a spring upon the rod between the handles for resiliently holding the jaws closed.

4. A trolley wheel guard, including a plate for attachment to a trolley pole, a pin carried by and centrally of and adjacent one end of the plate, said pin projecting from the face of the plate, two wire embracing members pivoted upon the pin and each having a relatively long truncated lug forming a contact member of the jaw thereof, the jaw being projected beyond the end of the plate, each member having a handle, a spring disposed between the handles of both members for resiliently holding the reduced ends of the truncated lugs into contact and wire embracing position, and two pins carried by the plate upon each side of the pivoting pin, to limit the oscillatory movement of the two wire embracing members.

5. A trolley wheel guard, including a plate for attachment to a trolley pole, a pin carried by and centrally of and adjacent one end of the plate, said pin projecting from the face of the plate, two wire embracing members pivoted upon the pin, and each having a relatively long truncated lug forming a contact member of the jaw thereof, the jaw being projected beyond the end of the plate, each member further having a handle, a segmental rod threaded through the handles and limiting the extension of the handles, a spring upon the rod between the handles for resiliently holding the jaws closed, and two pins carried by the plate, one upon each side of the pivoting pin, to limit the oscillatory movement of the two wire embracing members.

In testimony that I claim the foregoing as my own, I have hereto affixed my signature in the presence of two witnesses.

ALLEN W. HART.

Witnesses:
ADRIAN A. MINDER,
HOWARD HEITZELT.

Copies of this patent may be obtained for five cents each, by addressing the "Commissioner of Patents, Washington, D. C."